United States Patent [19]

Shallenberger et al.

[11] Patent Number: 4,641,409
[45] Date of Patent: Feb. 10, 1987

[54] RECONSTITUTING A NUCLEAR REACTOR FUEL ASSEMBLY

[75] Inventors: John M. Shallenberger, O'Hara Township, Allegheny County; Stephen J. Ferlan, Wilkins Township, Allegheny County, both of Pa.

[73] Assignee: Westinghouse Electric Corp., Pittsburgh, Pa.

[21] Appl. No.: 613,833

[22] Filed: May 24, 1984

Related U.S. Application Data

[62] Division of Ser. No. 422,224, Sep. 23, 1982, abandoned.

[51] Int. Cl.⁴ .................. B21K 21/16; B23P 17/04; B23P 23/00; G21C 3/30
[52] U.S. Cl. ................ 29/401.1; 29/402.08; 29/157.3 C; 29/157.4; 29/523; 285/382.5; 376/446; 376/449; 376/353
[58] Field of Search ........... 376/446, 449, 353, 327, 376/463; 29/723, 726, 400 N, 157.3 C, 523, 522 R, 401.1, 402.08, 157.4; 285/382.5

[56] References Cited

U.S. PATENT DOCUMENTS

| 4,326,921 | 4/1982 | Cadwell | 376/449 X |
| 4,535,523 | 8/1985 | Leclercq | 376/446 X |

FOREIGN PATENT DOCUMENTS

| 0036821 | 9/1981 | European Pat. Off. | 376/446 |
| 1228610 | 4/1971 | United Kingdom | 376/446 |

Primary Examiner—Deborah L. Kyle
Assistant Examiner—Dan Wasil

[57] ABSTRACT

A method for reconstituting a nuclear reactor fuel assembly having its top nozzle adapter plate welded to its control rod guide thimble sleeves. Circumferentially cut the sleeves from the adapter plate below the weld. Separate the top nozzle from the cut sleeve 5. Obtain a modified top nozzle refashioned with a groove in its adapter plate control rod passageways. Insert the cut sleeves in the passageways of the modified top nozzle. Circumferentially bulge the sleeves into the grooves. A system for attachment of the top nozzle to the sleeves employing the above-described circumferential bulge and groove attachment.

8 Claims, 5 Drawing Figures

RECONSTITUTING A NUCLEAR REACTOR FUEL ASSEMBLY

This is a division of application Ser. No. 06/422,224, filed Sept. 23, 1982, now abandoned.

BACKGROUND OF THE INVENTION

The present invention relates generally to fuel assemblies for nuclear reactors and, more particularly, to a method for reconstituting a fuel assembly by removal and attachment of top nozzles and to a reconstituted fuel assembly with an improved top nozzle attachment system.

Conventional designs of fuel assemblies include a multiplicity of fuel rods and control rod guide thimbles held in an organized array by grids spaced along the fuel assembly length. The grids are attached to the control rod guide thimbles. Top and bottom nozzles on opposite ends thereof are secured to the control rod guide thimbles which extend slightly above and below the ends of the fuel rods. At the top end of the assembly, the guide thimbles are attached in openings provided in the top nozzle. The guide thimbles may each be surrounded by a sleeve for attachment to the top nozzle and to the uppermost grid.

During operation of such assembly in a nuclear reactor, the fuel rods may occasionally develop cracks along their length resulting primarily from internal stresses thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored.

Under these circumstances, it is difficult to detect and remove failed fuel rods because they are part of an integral assembly of guide tubes welded to the top and bottom nozzles. Consequently, to gain top access to individual fuel rods, it is necessary to remove the affected assembly from the nuclear reactor core and then break the welds which secure the top nozzle to the control rod guide thimbles. In so doing, the destructive action often renders the fuel assembly unfit for further use in a reactor because of the damage done to both the guide thimbles and the top nozzle which prohibits rewelding.

In view of the high costs associated with replacing fuel assemblies, both domestic and foreign utilities have indicated an interest in reconstitutable fuel assemblies in order to minimize both their operating and maintenance expenses.

Conventional reconstitutable fuel assemblies incorporate design features (at the time of original manufacture) arranged to permit the rapid removal of individual failed fuel rods, the option to replace rods, followed by the additional use in the reactor and/or normal handling and storage of the affected fuel assembly. Reconstitution has been made possible by providing a fuel assembly with a removable top nozzle. The top nozzle is mechanically fastened usually by a threaded arrangement to the upper end of each control rod guide thimble assembly, and the top nozzle can be removed remotely from an irradiated fuel assembly while it is still submerged in neutron-absorbing liquid. With rod removal/replacement and after the top nozzle has been remounted on the control rod guide thimble tubes, the reconstituted assembly can then be reinserted into the reactor and used until the end of its useful life, and/or stored in spent fuel pools or other places in a safe, normal manner.

The conventional design philosophy for existing reconstitutable fuel assemblies has been to implement their costly reconstruction features on every fuel assembly at the time of original manufacture. The various threaded or other arrangements to removably attach each control rod guide thimble to the top nozzle represent a high cost in time and money for the added manufacturing operations, when only a very small percentage of the fuel assemblies will ever experience a leaky fuel rod and hence the need for reconstitution.

SUMMARY OF THE INVENTION

Briefly stated, the invention is directed towards a method for reconstituting a nuclear reactor fuel assembly which has its top nozzle adapter plate attached (such as by welding) to its control rod guide thimbles (or control rod guide thimble sleeves). The guide thimbles (or sleeves) are severed from the adapter plate by circumferential cutting below the attachment area. The top nozzle is removed from the cut guide thimbles (or sleeves). A second top nozzle is obtained with a modified adapter plate having some of its control rod passageways refashioned with a groove. The cut sleeves are inserted in the secnd top nozzle adapter plate control rod passageways. The associated guide thimbles (or sleeves) are circumferentially bulged into the grooves. The method can also be employed to reconstitute a fuel assembly (such as a previously reconstituted one) having its top nozle attached to its guide thimbles (or sleeves) by a circumferential bulge/groove system.

The invention is also directed towards a nuclear reactor fuel assembly having a number of its top nozzle adapter plate control rod passageways with a groove and having the associated control rod guide thimbles (or control rod guide thimble sleeves, or both) circumferentially bulged into the grooves.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may best be understood by reference to the following description taken in connection with the accompanying drawings in which:

FIG. 4 also represents the end result of the invention's method of fuel assembly reconstitution carried out on the attachment system of FIG. 3.

FIG. 5 also represents the end result of the invention's method of fuel assembly reconstitution carried out on the attachment system of FIG. 4 (such as in a second reconstitution of a fuel assembly).

DETAILED DESCRIPTION OF THE INVENTION

Figure 1:
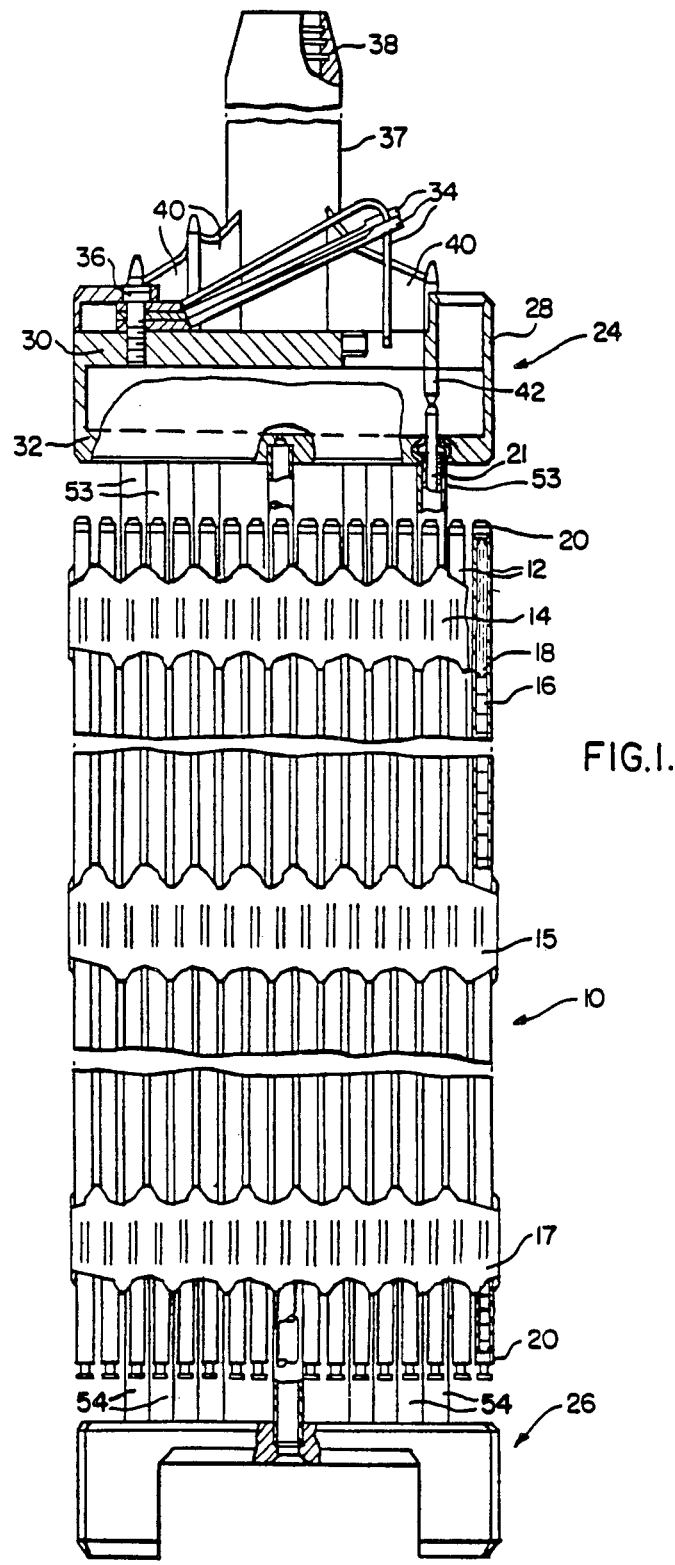
FIG. 1 is a view in elevation partially in section, illustrating the design of a fuel assembly which incorporates an embodiment of the invention's top nozzle to control rod guide thimble attachment system.
Figure 2:
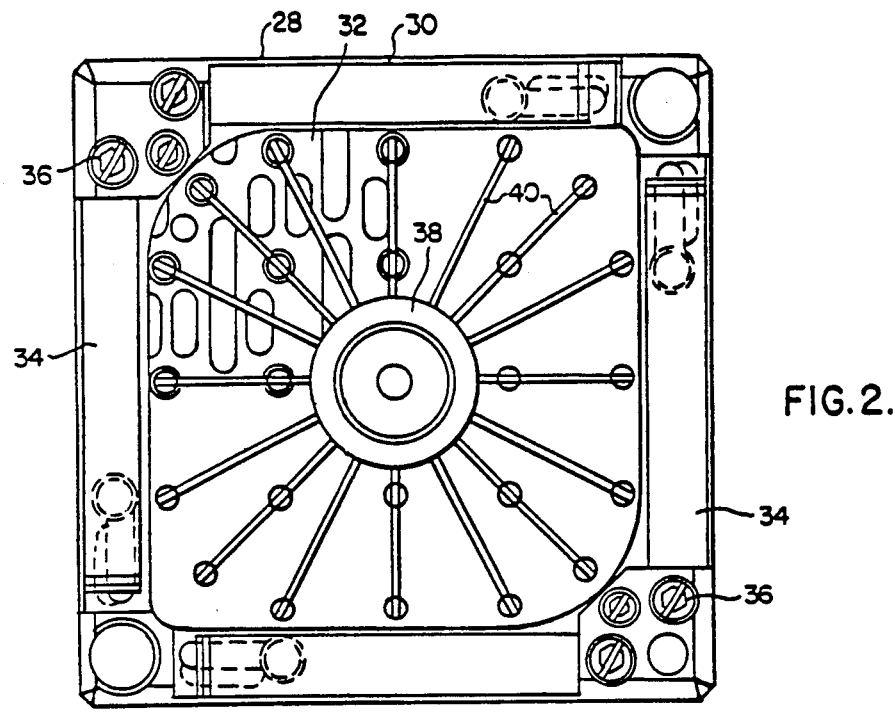
FIG. 2 is a plane view of the fuel assembly shown in FIG. 1.

Referring now to the drawings wherein like reference characters designate like or corresponding parts throughout the several views, there is shown in FIGS. 1 and 2 a nuclear reactor fuel assembly 10 including an array of fuel rods 12 held in spaced relationship to each other by grids 14, 15 and 17 (only three of which are shown in FIG. 1) spaced along the fuel assembly length. Each fuel rod includes nuclear fuel pellets 16 and a spring 18 located in the plenum of each fuel rod, and the ends of the rods are closed by end plugs 20, all in a conventional manner.

To control the fission process, a multiplicity of control rods 21 are reciprocally movable in control rod guide tubes or guide thimbles located at predetermined positions in each selected fuel assembly in the reactor. The guide thimbles are attached to the grids 14, 15 and 17. The reactor includes a top nozzle 24 and a bottom nozzle 26 to which opposite ends of the control rod guide thimbles are attached to form an integral assembly capable of being conventionally handled without damaging the assembly components.

Figure 4:
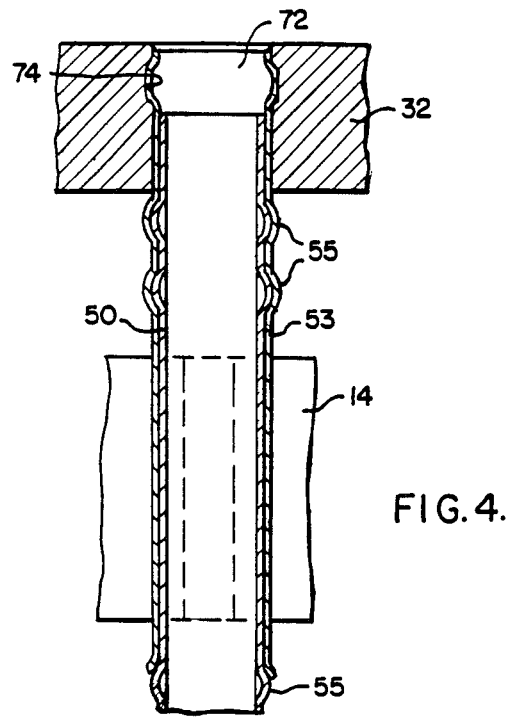
FIG. 4 is an enlarged cross-sectional view of a portion of FIG. 1 showing in greater detail the invention's attachment system embodiment.

Typically the guide thimbles have sleeves for weld compatibility with the upper 14 and lower 17 grids and with the top 24 and bottom 26 nozzles. In this case, as shown in FIGS. 1 and 4, a sleeve 53 is used to join the guide thimble 50 to the lower grid 17 and the bottom nozzle 26. Each guide thimble 50 extends the full length of the fuel assembly 10 between the top nozzle 24 and the bottom nozzle 26. The sleeve 53 only extends from the top nozzle 24 to the upper grid 14, and the sleeve 54 only extends from the bottom nozzle 26 to the lower grid 17. The guide thimble 50 is attached to the sleeve 53 by a bulge fit. The bulge fit typically consists of bulges 55 arrayed in three axially spaced sets (two sets between the top nozzle adaptor plate 32 and the upper grid 14 and one set below the upper grid 14), with each set consisting of four symmetrically spaced apart bulges. The guide thimble 50 can be attached to the sleeve 54 in a like manner.

As illustrated in FIGS. 1 and 2, the top nozzle is square in cross section and comprises a housing 28 having an upper plate 30 spaced from a (lower) adapter plate 32. Assembly hold-down springs 34 attached to opposite sides of upper plate 30 are held in place by bolts 36 and are adapted to be compressed when the reactor upper core plate (not shown) is placed in position. The top nozzle further includes a rod cluster control assembly 37 comprising an internally threaded cylindrical member 38 having radially extending flukes or arms 40. A connector 42 interconnects each control rod 21 with the arms, the arrangement being such that the rod cluster assembly moves the control rods vertically in the control rod guide thimbles to thereby control the fission process in the assembly.

Figure 3:
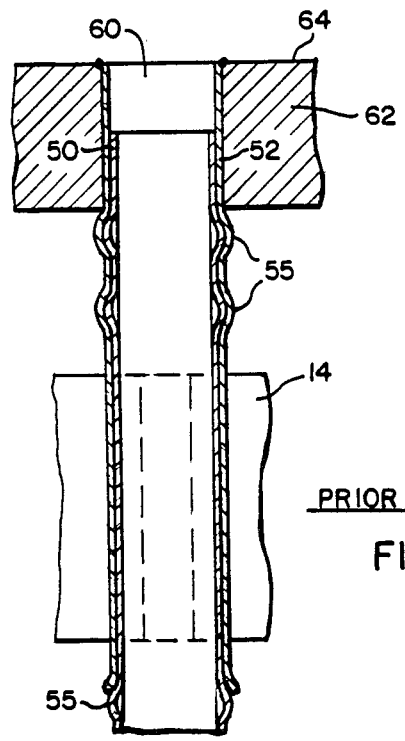
FIG. 3 is an enlarged cross-sectional view of a prior art top nozzle to guide thimble welded attachment system upon which the invention's method of fuel assembly reconstitution can be employed.

A preferred embodiment of the invention's method for reconstituting a nuclear reactor fuel assembly 10 by removal and replacement of top nozzles is illustrated in FIG. 3 as the "before" drawing and FIG. 4 as the "after" drawing. The control rod guide thimbles 50 (only one of which is illustrated in FIG. 3) have their uppermost sleeves 52 coaxially positioned within the controd rod passageways 60 of the top nozzle adapter plate 62. The sleeves 52 are attached to the top nozzle adapter plate 62 preferably by welding (or other metallurgical attachment) at the adapter plate's upper surface 64. This type of conventional attachment system is less costly in time and money when compared with existing reconstitutable fuel assemblies using threaded attachment systems in all assemblies at the time of original manufacture.

When a decision is made to reconstitute a fuel assembly 10 (which will occur in only a small percentage of fuel assemblies during their useful life), one would, using the method of the invention, sever the sleeves 52 from the adapter plate 62 by circumferentially cutting the sleeve walls below the area of attachment. Such cutting can be accomplished, for example, by using a conventional in-tube cutter, within the control rod passageway 60, to cut the sleeve wall (from inside out) below the welded attachment. Alternatively, such cutting can be accomplished by using a conventional holesaw type cutter proceeding from the upper surface 64 of the adapter plate 62 at a diameter and to a depth sufficient to cut the weld. The top nozzle with its adapter plate 6 is then removed from the grid sleeves by conventional means. The cutting and removal operations are performed remotely on the irradiated fuel assembly 10 while it is submerged in a neutron-absorbing liquid, such as water, thus providing access at the top end of the fuel assembly for the detection and removal of failed fuel rods.

A modified top nozzle 24 is obtained, preferably generally identical to the removed top nozzle, with its adapter plate 32 having control rod passageways 72, but with a plurality (and preferably all) of such passageways 72 having a channel or groove 74. The groove 74 is located in an area axially below the corresponding area on the removed top nozzle adapter plate 62 from which the sleeves 52 are severed. The groove 74 could be any shaped indentation, of various dimensions, in the all of the passageway 72. Preferably, the groove 74 is a coaxial, fully circular, circumferential groove. Preferably, the modified top nozzle 24 is an unirradiated one, but the removed top nozzle could be refashined if desired. The formation of the grooves can be accomplished by conventional cutting means known to those skilled in the art.

The cut sleeves 53 with the control rod guide thimbles 50 are inserted into the control rod passageways 72 of the adapter plate of the modified top nozzle 24, to an axial distance above the grooves 74. Preferably, the cut sleeves 53 are inserted from below in the passageways 72 to an axial position generally equal to that where they were previously cut. The corresponding plurality of the inserted sleeves 53 are circumferentially bulged into the grooves 74. By "corresponding plurality" is meant the sleeves 53 which are inserted in the plurality of passageways 72 having the grooves 74. The circumferential bulging is performed by conventional means known to those skilled in the art. For example, the bulging could be accomplished by hydraulic pressure of a fluid introduced into the control rod passageway through holes in a fluid supply tube having seals above and below the groove to contain the fluid in the passageway to bulge the sleeve into the groove. Another method could employ a piston and its rod in the passageway, with the piston below the groove being drawn by its rod up the passageway closer to the groove to compress an introduced material (such as polyurethane) against a seal (located above the groove) through which the shaft is drawn to contain the material in the passageway to bulge the sleeve into the groove. Both the insertion and bulging operations can be performed remotely.

The above-described method also permits access to fuel rods in an assembly to allow for the transfer of partially spent fuel rods from one damaged skeleton, for example, to another thus permitting the fuel rods to achieve their intended burnup levels. The method further permits access for the removal and/or rearrangement of fuel rods to attain better uranium utilization in the reactor.

Figure 5:
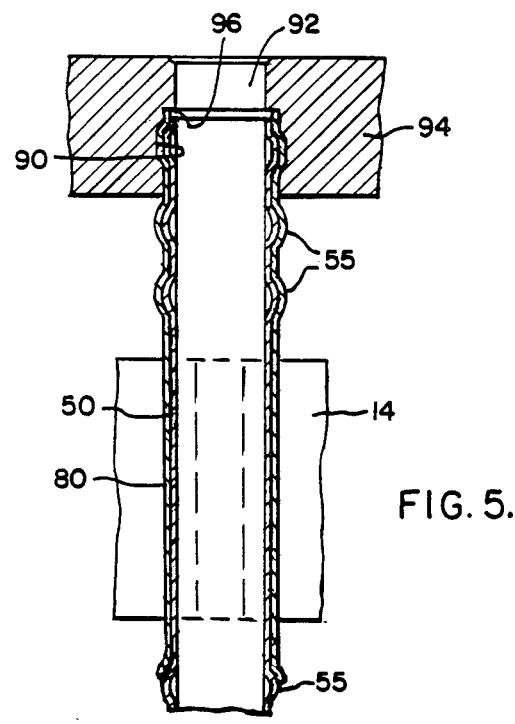
FIG. 5 shows an alternate embodiment of the attachment system of FIG. 4.

The method of the invention is equally applicable to reconstitute fuel assemblies having their control rod guide thimbles directly attached (such as by welding) to the top nozzle adapter plate without any intervening sleeves. In this case, the cutting and bulging operations would be performed on the guide thimbles instead of the sleeves. It can be appreciated by those skilled in the art that the method of the invention is also applicable to reconstitute fuel assemblies having (at the time of original manufacture or, preferably, at the time of first reconstitution) their guide thimbles (or sleeves) circumferentially bulged into grooves on their adapter plate control rod passageways. This allows for additional reconstitution of a previously reconstituted fuel assembly. For example, FIG. 4 could represent the "before" drawing and FIG. 5 could represent the "after" drawing of a twice reconstituted fuel assembly. In FIG. 5, the twice-cut sleeve 80 of the control rod guide thimble 50 as well as the control rod guide thimble 50 itself are circumferentially bulged into a lower groove 90 in the control rod passageway 92 of the adapter plate 94 of another top nozzle. The groove 90 is located below the corresponding area of the previous top nozzle adapter plate 32 (see FIG. 4) from which the sleeve 53 was severed. It should be noted that due to the lower location of the groove 90, the circumferential bulging of the sleeve 80 also requires the circumferential bulging of the overlapping control guide thimble 50.

From the previous discussion it can be seen that the invention encompasses a nuclear reactor fuel assembly top nozzle to control rod guide thimble attachment system. The attachment system can be used at the time of original manufacture of the fuel assembly, or preferably at the time of fuel assembly reconstitution. Employment of the attachment system of the invention only at reconstitution results in lower total costs in time and money when the original fuel assembly uses, for example, a welded top nozzle to control rod guide thimble attachment. This results from the fact that only a small percentage of the fuel assemblies will ever need reconstitution.

A preferred embodiment of the top nozzle to guide thimble attachment system, as shown in FIG. 4, employs a top nozzle with its adapter plate 32 having a number (at least two and preferably all) of its control rod passageways 72 modified with a groove 74. The attachment system also utilizes control rod guide thimbles 50 having sleeves 53. The sleeves are coaxially positioned in the control rod passageway. A corresponding number of sleeves are positioned axially above the grooves and are circumferentially bulged into the grooves. By "corresponding number" is meant the sleeves which are associated with the number of control rod passageways which have grooves.

An alternate attachment system (not shown in the drawings) has guide thimbles without sleeves with the guide thimbles circumferentially bulged into the grooves. Another attachment system (shown in FIG. 5) has both the sleeves 80 and the guide thimbles 50 circumferentially bulged into the grooves 90.

Optionally, means for positioning the sleeves (or guide thimbles) at a predetermined axial distance in the control rod passageways are employed. Preferably, (as shown in FIG. 5) such means includes an upper reduced diameter section of the passageway joined to the normal diameter section of the passageway by a shoulder surface 96 preferably axially located to maintain a constant height of the top nozzle in the fuel assembly by accounting for the length of the sleeve previously cut off. Alternatively, the sleeve 80 could be fitted with a collar abutting the lower surface of the adapter plate 94.

Tensile strength tests on a control rod guide thimble sleeve portion circumferentially bulged into a coaxial, fully circular, circumferential groove in a control rod passageway of a top nozzle adapter plate section showed the attachment to be stronger than the sleeve itself.

It will be apparent that many modifications and variations are possible in light of the above teachings. It, therefore, is to be undertood that within the scope of the appended claims, the invention may be practiced other than as specifically described.

What is claimed is:

1. A method for reconstituting a nuclear reactor fuel assembly having its uppermost control rod guide thimble sleeves coaxially disposed within its first top nozzle adaptor plate control rod passageways and attached to its first top nozzle adaptor plate, comprising:
   (a) circumferentially cutting the sleeve walls below the area of attachment to sever the sleeves from the first adaptor plate;
   (b) removing the first top nozzle, including the first adaptor plate, from the cut sleeves;
   (c) obtaining a second top nozzle with its adaptor plate having a plurality of its control rod passageways with a groove axially disposed below the corresponding area on the first top nozzle adaptor plate from which the sleeves were severed;
   (d) inserting the cut sleeves into the second top nozzle adaptor plate control rod passageways to an axial distance above said grooves; and
   (e) circumferentially bulging a corresponding plurality of the inserted cut sleeves into said grooves.

2. The method of claim 1, wherein said sleeves are welded to the first top nozzle adaptor plate upper surface.

3. The method of claim 1, wherein said first top nozzle adaptor plate control rod passageways each has a channel and wherein said sleeves are circumferentially bulged into said channels.

4. A method for reconstituting a nuclear reactor fuel assembly having its control rod guide thimbles co-axially disposed within its first top nozzle adaptor plate control rod passageways and attached to its first top nozzle adaptor plate, comprising:
   (a) circumferentially cutting the guide thimble walls below the area of attachment to sever the guide thimbles from the first adaptor plate;
   (b) removing the first top nozzle, including the first adaptor plate, from the cut guide thimbles;
   (c) obtaining a second top nozzle with its adaptor plate having a plurality of its control rod passageways with a groove axially disposed below the corresponding area on the first top nozzle adaptor plate from which the guide thimbles were severed;

(d) inserting the cut guide thimbles into the second top nozzle adaptor plate control rod passageways to an axial distance above said grooves; and (e) circumferentially bulging a corresponding plurality of the inserted cut guide thimbles into said grooves.

5. The method of claim 4, wherein said guide thimbles are welded to the first top nozzle adaptor plate upper surface.

6. The method of claim 4, wherein said first top nozzle adaptor plate control rod passageways each has a channel and wherein said guide thimbles are circumferentially bulged into said channels.

7. The method of claim 1, wherein said groove is a coaxial, fully circular, circumferential groove.

8. The method of claim 4, wherein said groove is a coaxial, fully circular, circumferential groove.

* * * * *